United States Patent [19]

Kodokian

[11] Patent Number: 5,762,741
[45] Date of Patent: Jun. 9, 1998

[54] METHOD FOR BONDING POLYMERIC ARTICLES

[75] Inventor: George Kevork Kodokian, Wilmington, Del.

[73] Assignee: E.I. du Pont de Nemours and Company, Wilmington, Del.

[21] Appl. No.: 531,580

[22] Filed: Sep. 21, 1995

Related U.S. Application Data

[63] Continuation of Ser. No. 171,078, Dec. 21, 1993, abandoned.

[51] Int. Cl.$^6$ ............................. B32B 31/06; B32B 31/22
[52] U.S. Cl. ................ 156/153; 156/274.8; 156/275.3; 156/311; 156/312; 156/314; 156/315; 156/333
[58] Field of Search .................. 156/333, 272.2, 156/153, 274.8, 275.3, 311, 312, 314, 315; 428/422

[56] References Cited

U.S. PATENT DOCUMENTS

| | | | |
|---|---|---|---|
| Re. 32,103 | 4/1986 | Struve | 156/153 |
| 2,393,541 | 1/1946 | Kohler | 20/5 |
| 2,833,686 | 5/1958 | Sandt | 428/422 |
| 3,663,333 | 5/1972 | Palfreyman | 156/256 |
| 3,946,136 | 3/1976 | Fitz et al. | 428/422 |
| 4,211,594 | 7/1980 | Freitag | 156/158 |
| 4,215,177 | 7/1980 | Strassel | 428/413 |
| 4,218,275 | 8/1980 | Kadija et al. | 156/73.1 |
| 4,465,547 | 8/1984 | Belke, Jr. et al. | 156/629 |
| 4,824,498 | 4/1989 | Goodwin et al. | 156/71 |
| 4,824,511 | 4/1989 | Hartman et al. | 156/333 |
| 5,248,864 | 9/1993 | Kodokian | 219/10.41 |
| 5,264,059 | 11/1993 | Jacaruso | 156/298 |

FOREIGN PATENT DOCUMENTS

| | | | |
|---|---|---|---|
| 3 732 360 | 11/1990 | Germany | C08L 27/18 |
| 53-21903 | 5/1978 | Japan | C08J 5/10 |
| 63-47113 | 2/1988 | Japan | B29C 43/02 |
| 795361 | 5/1958 | United Kingdom . | |
| 1135803 | 12/1968 | United Kingdom . | |
| 1 505 077 | 3/1978 | United Kingdom | C08J 5/00 |
| WO 90/08027 | 7/1990 | WIPO . | |

OTHER PUBLICATIONS

Schwartz, Seymour S. and Sidney H. Goodman, *Plastic Materials and Processes*, "Fastening and Joining Techniques", Van Nostrand Reinhold Company, pp. 777–794.

Volume 1, Engineered Materials Handbook: Composites, p. 20, ASM International.

*Primary Examiner*—Jenna Davis
*Attorney, Agent, or Firm*—Jane Obee Hamky

[57] ABSTRACT

The present invention relates to methods for bonding articles made of polymers, and in particular, fluoropolymers. According to a first embodiment of the present invention, the method comprises the steps of coating the surface of either one or both of the articles to be bonded with a third polymer so that one or both of the articles has a layer of the third polymer adhered thereto, and bringing the articles into contact with each other after the articles are coated in order to bond the articles together. According to a second embodiment, the method comprises the steps of placing a composite layer comprising either conductive or magnetic materials, or both, between the articles, bringing the articles and the composite layer into contact with each other and electromagnetically heating the composite layer to bond the articles together.

15 Claims, 4 Drawing Sheets

METHOD FOR BONDING POLYMERIC ARTICLES

This is a continuation of application Ser. No. 08/171,078 filed Dec. 21, 1993, now abandoned.

BACKGROUND OF THE INVENTION

1. Field of the Invention

The present invention relates to methods for bonding articles made of polymers, and specifically, fluoropolymers. In particular, the present invention relates to coating the surface of at least one article to be bonded with a polymer, and placing an interlayer comprising either a conductive or a magnetic material or a polymer, or both, between articles to be bonded, and bringing the surfaces of the articles into contact with each other after the surfaces of the articles have been coated to bond the articles together.

2. Description of the Related Art

One measure of the quality of a bond between two articles is the reliability of the bond in corrosive process environments. In particular, fluoropolymers are often chosen for articles used in aggressive chemical environments, such as those containing hydrofluoric acid (HF), because they demonstrate excellent corrosion resistance. These materials, particularly polytetrafluoroethylene (PTFE), are often used as liners to protect steel vessels from stress cracking or corrosion attack. The difficulty with the use of fluoropolymers, however, lies in the inability to obtain high quality and reliable bonds. Bonding articles made of PTFE is especially difficult, since PTFE has a very high viscosity at or above its melt temperature. It is therefore not possible to bond PTFE as easily as other fluoropolymers which have lower viscosities, such as copolymers of tetrafluoroethylene (TFE).

Most methods to bond articles made of polymers, such as PTFE, employ a one-step process in which a melt-processable polymer is inserted at the bondline between the articles. The application of heat causes these melt-processable polymers to melt and join the PTFE. Such a process is disclosed by Fitz et al., in U.S. Pat. No. 3,946,136, which describes a method for joining shaped articles containing PTFE. This method employs an interlayer of a copolymer of PTFE and perfluoroalkyl-perfluorovinyl. The surfaces and the interlayer are connected by placing them between two plates heated to the required temperature, with a weight corresponding to the desired pressure placed on the top plate. By this method, the heat is then conducted through the PTFE articles to the interlayer. This can be damaging to the PTFE articles, further reducing structural integrity. Additionally, this technique, used over a wide range of temperatures and pressures, results in very poor and unreliable bonds, as analyzed by echo C-scans, shear and fracture tests, thereby making it unsuitable for use, especially in corrosive environments.

Generally, known one-step methods produce inferior quality welds for a number of reasons. Primarily, the heat needed to bond the interlayer and the articles is applied from the outside of the articles through the use of heated plates. This method depends on the heat conducting through the articles to reach the interlayer, which flows and bonds the two articles together when the interlayer's melting point is reached. It is difficult to ascertain by this method that the correct welding conditions have been achieved, i.e., that the proper temperature was reached and that a satisfactory, uniform weld was produced. In many cases the interlayer degrades or bubbles, which can provide a free passage for process leakage. Therefore, in manufacturing environments, there is an obvious practical need to guarantee that the interlayer has fused into the surfaces of the articles in order to prevent leaks.

SUMMARY OF THE INVENTION

Accordingly, the present invention solves the problems of the prior art by providing methods of bonding polymeric articles which produce bonds which are superior to those produced by methods of the prior art.

The present invention also solves the problems of the prior art by providing methods of bonding polymeric articles which produce bonds which are reliable, even in corrosive environments.

The present invention also solves the problems of the prior art by guaranteeing that the polymer used to bond the articles fuses into the surfaces of the articles in order to prevent leaks in the process in which the articles are used.

To achieve the foregoing solutions and in accordance with the purpose of the invention, as embodied and broadly described herein, there is provided a method for bonding a first article comprising a first polymer with a second article comprising a second polymer. According to a first embodiment of the present invention, the method comprises the steps of coating the surface of at least one article with a third polymer so that at least one article has a layer of the third polymer adhered thereto; and bonding the articles together by bringing the articles into contact with each other after the surface of the at least one article is coated.

According to a second embodiment of the present invention, the method comprises the steps of coating the surface of at least one article with a third polymer so that at least one article has a layer of the third polymer adherd thereto placing a composite layer comprising at least one of a conductive and a magnetic material between the first and second articles; bringing the first and second articles and the composite layer into contact with each other; and electromagnetically heating the composite layer after the articles are brought into contact with each other to bond the articles together.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1A:
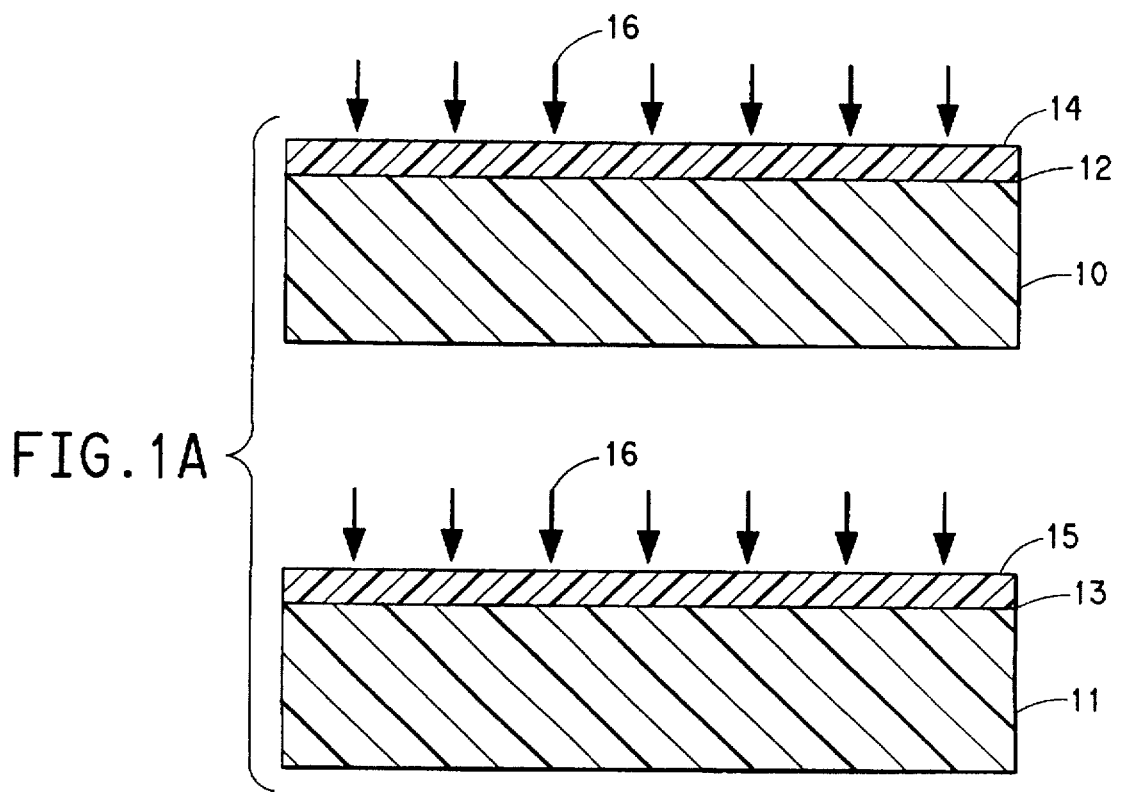
FIGS. 1A and 1B are a schematic diagram showing articles bonded according to one method of a first embodiment of the present invention.
Figure 1B:
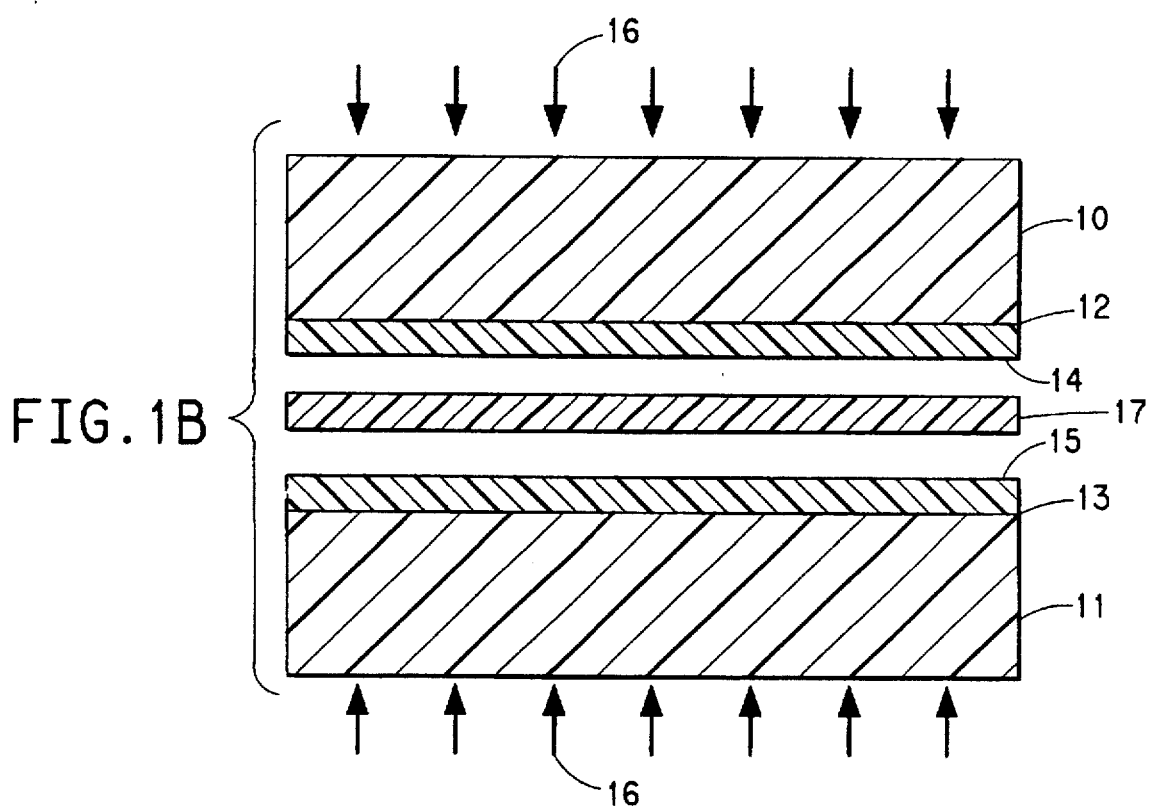

In accordance with a first embodiment of the present invention, there is provided a method for bonding a first article with a second article. FIGS. 1A and 1B are a schematic diagram which shows articles which are bonded according to the first embodiment of the present invention. A first article 10 and a second article 11 are illustrated in FIGS. 1A and 1B. The first article comprises a first polymer, and the second article comprises a second polymer. Any polymer will work as the first or second polymer for the present invention, such as thermoplastics or blends of thermosets, an exception being 100% thermosets. In a preferred embodiment, the first or the second polymers, or both, may comprise a fluoropolymer, such as polytetrafluoroethylene (PTFE). PTFE is a fluoropolymer characterized by high crystallinity and high thermal and chemical resistance and has the structural formula —$CF_2CF_2$—. Polytetrafluoroethylene is sold under the trademark "TEFLON" (hereinafter referred to as "Teflon®") by E. I. du Pont de Nemours and Company (hereinafter referred to as "DuPont") of Wilmington, Del. Another fluoropolymer suitable for use as the first or the second polymer, or both, is a polytetrafluoroethylene copolymer, such as Hostaflon TFM 1700, which is a polytetrafluoroethylene copolymer which contains pendant perfluoroalkoxy groups. Hostaflon TFM 1700 is commercially available from Hoechst-Celanese Corporation of Bridgewater, N.J. under the trade name Hostaflon TFM 1700. Another fluoropolymer, which is a modified copolymer of tetrafluoroethylene (TFE) and ethylene, sold under the trademark "TEFZEL"(Tefzel®) by DuPont, may be used as the first or the second polymer, or both. Also, polyvinylidine fluoride (PVDF), a fluoropolymer which is commercially available from Atochem North America of Philadelphia, Pa., under the trademark "KYNAR"(Kynar®) and which has the structural formula —$CH_2CF_2$—, is suitable for use as the first or the second polymer, or both. Each of the first and the second articles may consist entirely of the first and second polymers, respectively, or may comprise a blend of the first and second polymers, such as a blend of PTFE and PVDF. In addition, the first and second articles may comprise materials other than polymers, just as long as the articles include some polymer component. Such other materials include, but are not limited to, glass, fibers, ceramics and metals.

According to the method of the first embodiment of the present invention, the surface of at least one article is coated with a third polymer so that at least one article has a layer of the third polymer adhered thereto. This step is shown in particular with reference to FIG. 1A. As shown in both FIGS. 1A and 1B, a surface 12 of article 10 and a surface 13 of article 11 is coated with a third polymer, shown at 14 and 15, respectively. Although both surfaces 12 and 13 are shown coated, it is within the scope of the present invention that only one of the contacting surfaces be coated. It should be noted that when the surface of both articles is coated with the third polymer, the third polymer on the first article does not have to be the same as the third polymer on the second article. The third polymer may comprise any polymer, such as, for example, a thermoplastic or a blend of thermoset, an exception being 100% thermoset. The third polymer may be the same as either one of, or both, the first or the second polymer, or the third polymer may be different from either of these polymers. Moreover, the third polymer may consist of just one polymer, or may comprise a blend of polymers, such as a blend of PTFE and PVDF. In addition, the third polymer may comprise materials other than polymers, as long as it includes some polymer component. Such other materials include, but are not limited to, glass, fibers, ceramics and metals.

The method of the first embodiment of the present invention also comprises the step of bonding the articles together by bringing the articles into contact with each other after the surface of the at least one article is coated. The method of the first embodiment may therefore be referred to as a two-step method, since the articles are coated with a polymer before they are brought together. The step of bringing the articles together is illustrated with particular reference to FIG. 1B, which shows articles 10 and 11 in close proximity to each other.

The step of coating the surface of the articles with a third polymer before the articles are brought together in the first embodiment of the present invention allows the third polymer and the surfaces of the articles to fuse together. This provides a reliable bonded article, preventing leaks in the process in which the article is used. Such leaks are a problem in aggressive chemical environments. Moreover, the step of coating the surface of the articles with a third polymer before the articles are brought together makes physical inspection of the bond quality easier than in conventional methods. This is because the third polymer is first applied to the surface of at least one of the articles before the articles are brought together. Thus, one has the opportunity to visually inspect the results of the step in the joining of the articles and thereby assess the quality of the bond between the articles and the third polymer. Additionally, the two-step approach of the first embodiment of the present invention requires a lower temperature to bond the articles together when heat is used with the present invention, thereby minimizing the distortion of the articles, which could be a further source of process leaks in manufacturing environments.

With the present invention, theoretically, only about 500 nm. of interdiffusion between the third polymer and the first polymer, and between the third polymer and the second polymer, is required for proper adhesion. However, in practice, due to non-uniformities such as troughs and valleys in a given surface, it is preferred to deposit at least about 10 mils. (0.025 cm.) of the third polymer onto the surface of the articles, although as little as 1 mil. (0.0025 cm.) may be sufficient in some cases.

In one implementation of the first embodiment, hereinafter referred to as the film method, the third polymer must have a lower melting point than the melting point of either of the first and second polymers. For this film method, the third polymer may be referred to as a lower-melting polymer, or an LMP. It is preferred that the LMP used with the present invention have a lower viscosity at a given temperature, since its flow properties will then be more conducive to improved bonding.

With the film method, the surfaces of the articles may be abraded before the first and second articles are coated with the lower-melting, third polymer. This abrasion increases the adhesion of the third polymer to the articles. This abrasion may be achieved by treating the surfaces of the article or articles to be coated with a chemical abrasion agent. As used herein, a chemical abrasion agent is defined as a fluid which chemically alters the surface to be bonded by replacing surface ions, which leads to a higher surface energy. Non-limiting examples of such agents are liquid naphthalene, sodium complex (sold under the trademark "TETRA-ETCH"(hereinafter referred to as Tetra-Etch®), commercially available from Dow Chemical Company, Inc. U.S.A. of Midland, Mich. and $NH_3$ plasma gas. Preferably, the surfaces are first abraded with sandpaper and cleaned with a cleaning agent prior to treatment with the chemical abrasion agent.

With the film method, it may be further preferable that the lower-melting polymer is a fluoropolymer, (i.e., a polymer with at least one fluorine atom in its molecular structure), or an LMFP. In particular, when both the first and the second polymers comprise fluoropolymers, it is preferable, although not necessary, that the third polymer comprises a fluoropolymer LMP, or an LMFP. The following are non-limiting examples of LMFP's which are useful for bonding articles comprising PTFE or TFM according to the process of the present invention: a copolymer of tetrafluoroethylene (TFE), commercially available from DuPont, sold as Teflon® FEP fluoropolymer, and a copolymer of TFE, commercially available from DuPont, sold as Teflon® PFA fluoropolymer.

When the film method is employed, the method of the present invention may further comprise the step of placing an interlayer, such as interlayer 17 as shown in FIG. 1B, between the surfaces of the articles before the articles are brought into contact with each other. Interlayer 17 comprises a fourth polymer. The fourth polymer must have a lower melting point than the melting point of any of the first, second and third polymers, it being noted in particular that the interlayer need not have the same composition as the third polymer. This step is done to further ensure that there is a sufficient amount of polymer between the articles to form a uniform and high-quality bond. Generally, an interlayer having a thickness of about 10 mils (0.0025 cm.) is adequate in order to form this uniform, high-quality bond, regardless of the size of the article, as long as there is interdiffusion between the contacting polymers.

The film method of the first embodiment may further comprise the step of applying heat to the third polymer layer to adhere the third polymer layer to the article. The film method may further comprise the step of applying pressure to the third polymer layer to adhere the third polymer layer to the article. The application of heat and pressure during the coating step is illustrated by arrows 16 in FIG. 1A. The film method may further comprise the step of applying heat to at least one of the articles to enhance the bonding thereof. The film method may further comprise the step of applying pressure to at least one of the articles to enhance the bonding thereof. It should be noted that the application of pressure as described herein is in addition to the pressure the articles themselves apply to each other when they are brought together. The application of heat and pressure during the bonding step is illustrated by arrows 16 in FIG. 1B. In both the coating and the bonding cases, when heat is applied, the step of applying pressure is optional.

The temperature used for the coating step when heat is applied should be higher than the melting point of the lower-melting, third polymer and also, preferably lower than the melting point of the first and second polymers, to minimize deformation of the articles. Since heat can be applied directly where it is needed, i.e., to the surfaces to be bonded by using, for example, a heated plate or a similar device, the heat is conducted more evenly through the lower-melting, third polymer, and the adherence of the lower-melting, third polymer to the articles is thus improved over known methods.

When heat is applied the surfaces of the articles with the film method, the temperature used for the bonding step should again at least be greater than the melting point of the lower-melting, third polymer, and preferably lower than either of the melting points of the first and second articles. Generally, the temperature for this step can be slightly lower than that of the coating step. This is because, in this step, the lower-melting, third polymer is being bonded to itself, which better ensures an even and uniform bond than when bonding to a material having a higher melting point.

When pressure is applied during the coating step, only small amounts of pressure need to be applied (e.g., 5 psi) until there is sufficient interdiffusion of the third polymer with the first and second polymers, respectively. The application of pressure in fact facilitates this interdiffusion, which occurs just by virtue of the coating step.

With the film method, a slightly lower pressure can be employed in the bonding step as compared to the coating step, since uniform bonding of the lower-melting, third polymer with itself is more easily attained. As an example, when bonding first and second articles comprising PTFE using PFA as the lower-melting, third polymer, it was found that preferred bonding conditions occurred at a temperature of about 360° C. and a pressure of about 10 psi (34.5 kPa) for the coating step, and a temperature of about 330° C. and a pressure of about 2.5 psi (17.2 kPa) for the bonding step.

Figure 2:
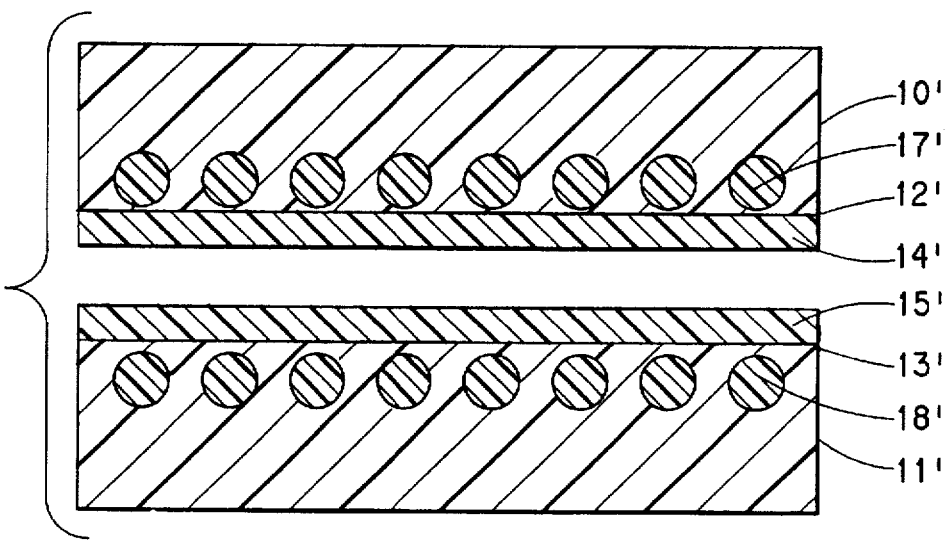
FIG. 2 is a schematic diagram showing the surfaces of the articles of FIGS. 1A and 1B embedded with a polymer in accordance with the one method of the first embodiment.

In the film method of the first embodiment, when heat and optionally pressure are applied, at least one of the surfaces of at least one of the first and second articles may be embedded with a fifth polymer before coating the surfaces of the articles. The fifth polymer must have a lower melting point than the melting point of any of the first, second and third polymers, it being noted in particular that the embedded need not have the same composition as the third polymer. This embedding facilitates bonding of the articles. This step is shown with reference to FIG. 2, which shows the fifth polymer embedded in a respective surface 12' and 13' of articles 10' and 11' at 17' and 18', respectively. As shown in FIG. 2, articles 10' and 11' are also coated with third polymers 14' and 15'. Although one surface of both articles is shown as being embedded with the fifth polymer, it is within the scope of the present invention to embed the fifth polymer in the only one surface of only one of the articles, or in more than one surface of one of both articles. Alternatively, either one or both of the entire first and second articles may be embedded with the fifth polymer before coating the surfaces of the articles. It should be noted that when the both articles are embedded with the fourth polymer, the fourth polymer in the first article does not have to be the same as the fourth polymer in the second article, as long as each of the fourth polymers has a lower melting point than any of the first, second or third polymers. The application of heat and pressure are not illustrated in FIG. 2 for simplicity sake, it being understood that at least heat, and optionally pressure, may be applied as shown above in FIGS. 1A and 1B. In particular, heat is applied in order to diffuse the embedded fifth polymer.

In a further implementation of the first embodiment, hereinafter referred to as the solution method, the third polymer comprises a solution of the third polymer and a solvent and the coating step comprises brushing the solution onto the surface of at least one article. For this solution method, the third polymer may be a lower-melting polymer, or an LMP, but it does not necessarily have to be. However, when an LMP is used, it is preferred that the LMP used with the solution method of the present invention have a lower viscosity at a given temperature, since its flow properties will then be more conducive to improved bonding. In addition, for the solution method, it may be further preferable, although not necessary, that the lower-melting, third polymer is a fluoropolymer, or an LMFP. A solution of 3 to 6 weight % PTFE in FC-75 is a non-limiting example of a polymer solution that can be used with the solution method. Typically, as an example, a suitable solvent for PTFE, which may be used as the third polymer, is FC-75 (2,2,3,3,4,4,5-heptafluorotetrahydro-5-(nonafluorobutyl)-furan), commercially available from Minnesota Mining and Manufacturing Co., Inc. (hereinafter referred to as the 3M Company) of Saint Paul, Minn.

Figure 3A:
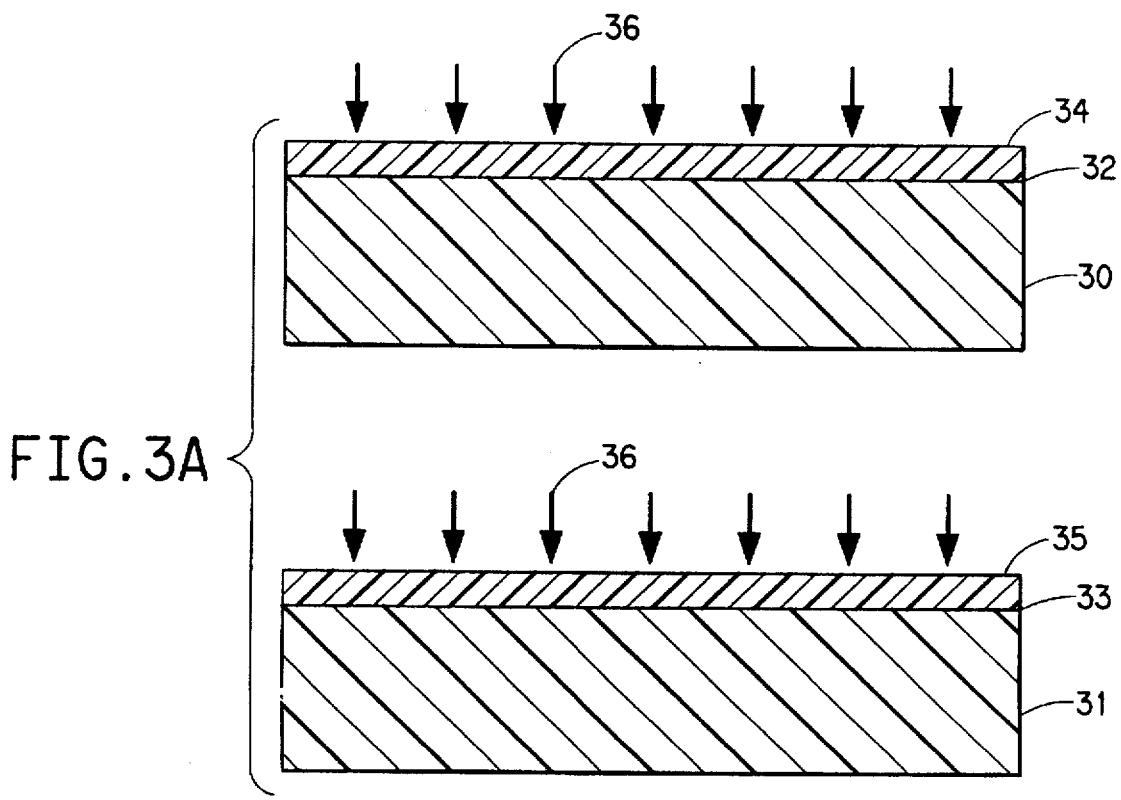
FIGS. 3A and 3B are a schematic diagram showing articles bonded according to another method of the first embodiment of the present invention.
Figure 3B:
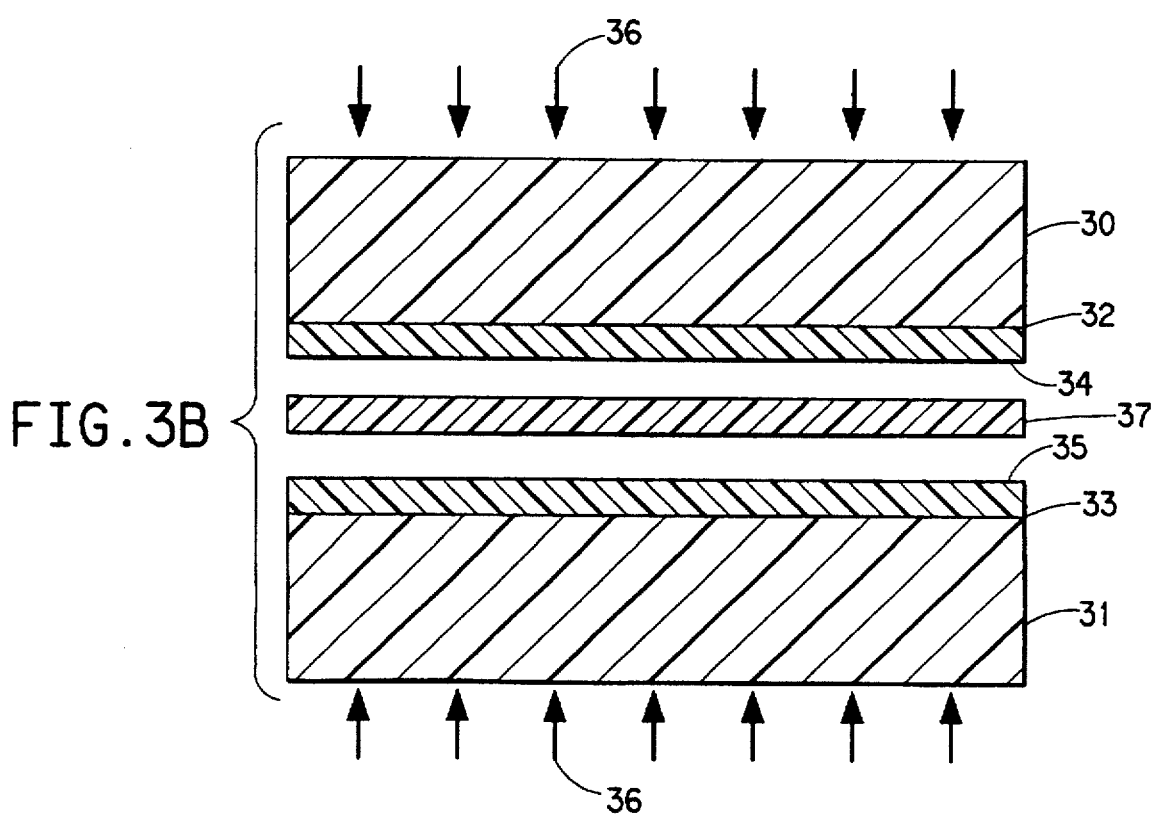

The solution method is illustrated with respect to FIG. 3, where a first article 30 and a second article 31 are shown. A solution is brushed onto a respective surface 32 and 33 of at least one of articles 30 and 31 as shown at 34 and 35, respectively, in FIG. 3, it being understood, of course, that the solution need only be brushed onto the contacting surface of one article. The solution is allowed to dry before and after the surfaces of the articles are brought together, and as they are brought together. Bonding occurs as the solution is allowed to dry. This solution method allows articles of any thickness to be bonded, without the aid of heat or pressure.

With the solution method, the surfaces of the articles may be abraded before the first and second articles are coated with the solution of the third polymer. As noted above with respect to the film method, such abrasion increases the adhesion of the third polymer to the articles. This abrasion may be achieved as described above with respect to the film method.

With the solution method of the present invention, it is possible to place an interlayer comprising a fourth polymer between the surfaces of the articles before the articles are brought into contact with each other. This step is done to further ensure that there is a sufficient amount of polymer between the articles to form a uniform and high-quality bond. An interlayer can be used with the solution method as long as the solution is sufficiently dry to adhere to the articles and the interlayer before the articles and the interlayer are all brought together. The fourth polymer must have a lower melting point than the melting point of any of the first, second and third polymers, it being noted in particular that the interlayer need not have the same composition as the third polymer.

The important advantage of the solution method is the ability to easily bond structures of any thickness, without the need for heat or pressure (from a source other than the articles themselves), thus making the method less expensive, as well as preventing deformation to the articles being bonded. However, heat can be applied, with or without pressure, if desired, as discussed above with respect to the film method, both to the third polymer layer to adhere the third polymer layer to the articles, and to the articles to enhance the bonding thereof. It should be noted that, in the solution method, pressure can be applied with or without heat. The application of heat and/or pressure during the coating step is illustrated by arrows 36 in FIG. 3A. The application of heat and/or pressure during the bonding step is illustrated by arrows 36 in FIG. 3B. At lower temperatures, such as about 50° C. to 60° C., the heat will evaporate the solvent more quickly. Higher temperatures can be employed to melt and fuse the polymer (from solution) to the surfaces of the articles. For a PTFE solution in FC-75, temperatures of about 40° C. above the glass transition temperature (about 200° C.) is sufficient for bonding. The temperature should not exceed about 330° C. to avoid degradation of the PTFE.

Figure 4:
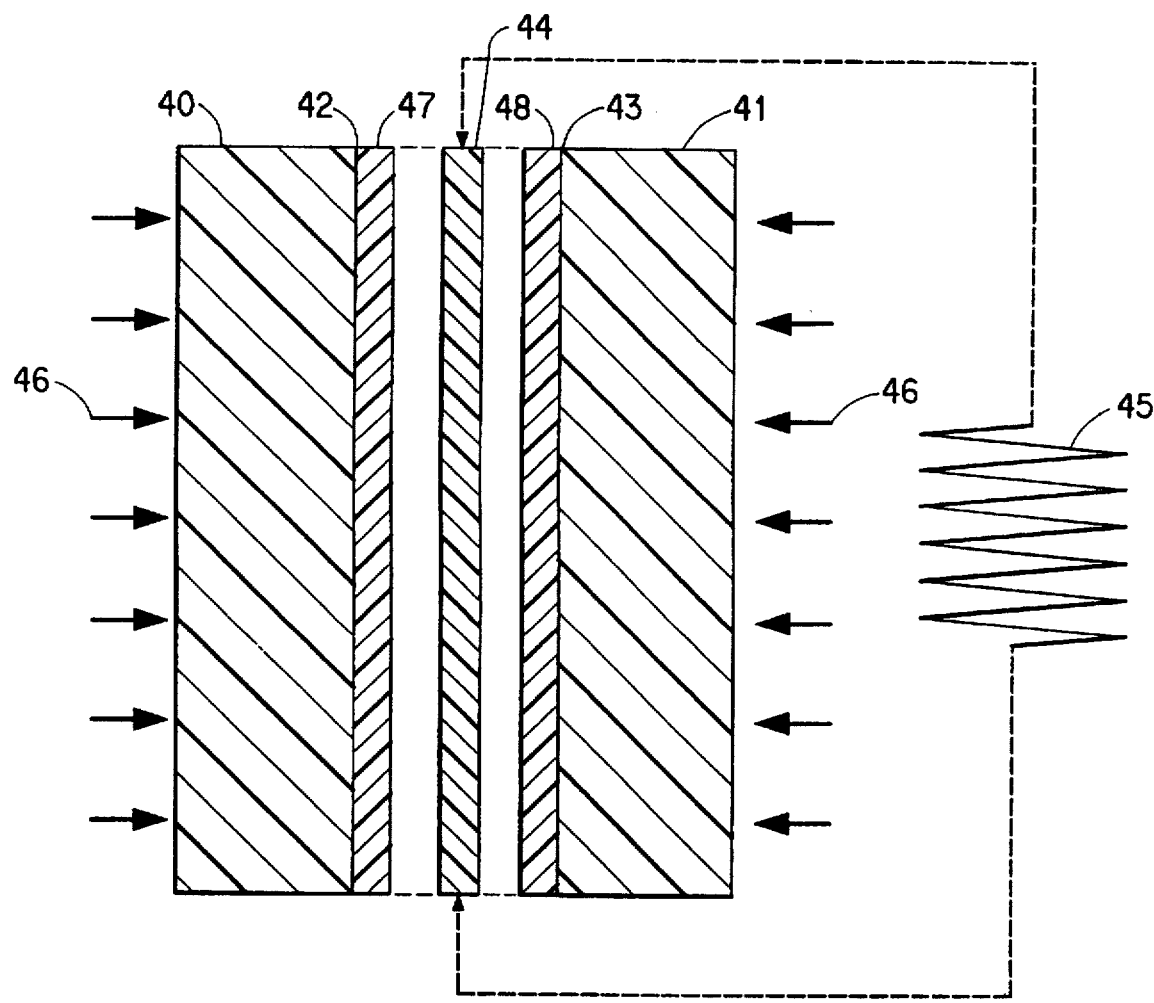
FIG. 4 is a schematic diagram showing articles bonded according to a second embodiment of the present invention.

In accordance with the present invention, there is provided a second embodiment of the method for bonding a first article comprising a first polymer and a second article comprising a second polymer. This second embodiment is illustrated with respect to FIG. 4, where a first article is shown at 40, and a second article is shown at 41. First article has a surface 42, and second article has a surface 43 as shown in FIG. 4. The first and the second polymers may be the same as those described above with respect to the first embodiment. According to this embodiment, the method comprises the step of coating the surface of at least one article with a third polymer so that at least one article has a layer of the third polymer adhered thereto. This step is done to ensure that there is a sufficient amount of polymer between the articles to form a uniform and high-quality bond, as in the first embodiment. As shown in FIG. 4, surfaces 42 and 43 are coated with a layer of a third polymer as shown at 47 and 48, respectively. Although both surfaces 42 and 43 are shown coated, it is within the scope of the present invention that only one of the surfaces be coated. Moreover, it should be noted that when the surfaces of both articles are coated, the third polymer on the first article does not have to be the same as the third polymer on the second article, as long as each of the third polymers has a lower melting point than the melting points of the first and second polymers. Either the film method or the solution method of the first embodiment as described above may be used to coat the articles. The articles may be abraded as described above with respect to the film method before they are coated. Also, in the second embodiment, it may be desirable to use an article embedded with the third polymer as described above with respect to the first embodiment. The composition of the third polymer is the same as that as discussed above with respect to the first embodiment, it being noted that the third polymer need not have the same composition as the first and second polymers. The third polymer must have a lower melting point than the melting point of the first and second polymers. The method of the second embodiment also comprises the step of placing a composite layer comprising either a conductive or a magnetic material, or both, between the articles. Alternatively, the composite layer may consist essentially of either a conductive or a magnetic material, or both. As shown in FIG. 4, a composite layer 44 is placed between surfaces 42 and 43 of the first and second articles, respectively. The conductive material may comprise conductive fibers, which provide for more uniform heating and hence improved bonding. The magnetic material is not conductive, but heats up with hysteresis loss. Such a magnetic material is described in U.S. Pat. No. 2,393,541, which discloses that by properly selecting finely divided metal particles and alloys having ferromagnetic properties, the heating temperature in the presence of a high-frequency magnetic field may be readily limited and controlled. An example of such a material is a ceramic, ferric oxide being a specific example of a magnetic ceramic.

The method of the second embodiment of the present invention also comprises the step of bringing the first and second articles and the composite layer into contact with each other. The method of the second embodiment may be referred to as a two-step method because the composite layer must be placed between the articles before the articles are brought into contact with each other.

The method of the second embodiment of the present invention also comprises the step of electromagnetically heating the composite layer to bond the articles together. In a preferred embodiment, this electromagnetic heating is performed by an induction heater 45 as shown in FIG. 4. However, it should be understood that the method of the second embodiment need not be limited to induction heating, and that the composite layer may be heated up to microwave frequencies. The heat may be applied at the bondline. It should be noted that when an induction heater is used, heating will occur at the bondline. This minimizes structural deformation, which can occur in conventional bonding methods. If the composite layer consists essentially of either a conductive or a magnetic material, the material is heated to the melting temperature of either the first or the second polymer, whichever is higher.

Pressure may be applied during the induction heating step, as shown at arrows 46 in FIG. 4. This may be done, for instance, with a pressure plate. A practical way to apply pressure in this embodiment is to put an induction coil in a pressure plate.

The composite layer may further comprise a fourth polymer, such as the fourth polymer as discussed above with respect to the first embodiment. In this case, the induction heating step comprises heating the composite layer to a temperature greater than the melting point of the fourth polymer. The third polymer must have a lower melting point than that of the first and second polymers, as noted above, and than that of the fourth polymer. The fourth polymer need not have the same composition as the third polymer. It may be preferable that the fourth polymer is an LMP, or even further preferably, an LMFP as described above with respect to the first embodiment. In a specific example for this embodiment, the fourth polymer comprises a copolymer resin of tetrafluoroethylene (Teflon® FEP), and the conductive material comprises carbon fibers embedded in a matrix of the resin. Another example of a conductive fiber is copper fibers. One example of a composite layer suitable for use with the second embodiment of the present invention is an eight-ply laminate of carbon fibers and PFA in a quasi-isotropic lay-up. A quasi-isotropic lay-up is defined as a laminate approximating isotropy by orientation of plies in several or more directions (*Engineered Materials Handbook, Volume 1, Composites*, ASM International, p. 20).

The orientation of the conductive fibers in the polymer matrix is important to ensure the most efficient conductance possible, and hence the most uniform heating. When bonding sructures, if an O-ring shaped inner layer is needed (such as when joining nozzles to process vessel liners), composites prepared from carbon fibers wound unidirectionally in a fluoropolymer composite layer is most preferred, since the conductance would then be maximized. Composite layers such as flat sheet lay-ups with carbon fibers oriented in a single direction are undesirable for any application, since conductance is less efficient due to the inefficient breakdown of the dielectric between the fibers.

If the method of the second embodiment is employed, any commercially available polymeric article of any thickness can be bonded. The advantages to this method are (i) heat is generated only where it is needed, i.e., at the bondline; (ii) relatively thick polymeric articles can be bonded together, as well as complex structures. This method also simplifies and facilitates repair of damaged structures. For example, in a structure made of two articles joined by the method of second embodiment of the present invention, if one of the articles becomes damaged, it can be easily and quickly replaced. Induction heat is simply first applied to soften and melt the resin in the composite layer, thus loosening the damaged article and allowing it to be removed. A new article can then replace the damaged article, and induction heating can be used to re-bond the articles.

TEST METHODS

In proceeding with the practice of the present invention, the bonds between articles were qualitatively assessed. To characterize the bonds, pulse echo C-scans, shear and compact tension analyses and scanning electron microscopy were primarily used.

Echo C-scan is the integration or area analysis of A-scan point-by-point testing. For the purposes of this invention, the samples were tested for bond quality using 5 MHz. sound waves. The required frequency varied, depending on the material of the article. For example, PTFE being a sintered material, required a lower frequency. Measuring the reflected sound waves gave an indication of the bond quality, since voids absorbed rather than reflected the impinging sound waves. Wave-loss measurement was confined to the 0–16 db range to limit the size of the voids that were detected; 0 db indicated almost no loss and hence, no detectable void. C-scans of the samples showed that the scan may be optimized within a certain temperature range, found to be about 330° C. to 350° C. under the conditions of this invention. High db numbers or white regions indicated poor bond regions.

Lap shear analysis results gave an indication of the strength of the bond. For this analysis per ASTM Standard D3163, standard specimens were prepared and tested, having dimensions of ⅛ inch×1 inch 5 inches (0.32 cm.×2.54 cm.×12.7 cm.) and overlap of ⅛ inch to ¼ inch (0.32 cm. to 0.64 cm.). Results from samples prepared from the two-step method of the present invention indicated no failure of the bond, and instead found elongation of the first and second polymers.

In compact tension analysis, all the stress is at the bondline, and if the interface between the third polymer, or the composite layer, and either of the articles is weak, then that is where the crack will jump and propagate. Compact tension, KIc, was analyzed by ASTM Standard E399, and standard specimens were prepared and tested having dimension 1 inch×1 inch×2.5 inches (2.54 cm.×2.54 cm.×6.35 cm.). These samples were thermally fatigued 25 times between −25° C. and 100° C.; 24 hours per cycle, i.e., 12 hours at each extreme temperature to effectively simulate process conditions. Per ASTM Standard E399, the KIc value for compact tension was calculated by the following equation:

$$KIc = \frac{P(f(a/W))}{(BW^{0.5})}$$

where

P=applied load a=crack length, from centerline of hole to crack in interface

W=width, approximately 2 inches (5.1 cm.) from centerline of hole to end of sample a/W=approximately 0.5

W/2=actual sample width, 1 inch (2.54 cm.)

B=height of sample, equal to approximately 0.6 W when the third polymer or the composite layer is included L=length of sample=1.25 W; and f=the function or calibration number for specific a/W ratios as follows:

| a/W | f(a/W) |
|---|---|
| 0.480 | 9.09 |
| 0.485 | 9.23 |
| 0.490 | 9.37 |
| 0.495 | 9.51 |
| 0.500 | 9.66 |
| 0.505 | 9.81 |
| 0.510 | 9.96 |
| 0.515 | 10.12 |
| 0.520 | 10.29 |

Photomicrographs of the failed surfaces showed that the crack propagated either through the bondline and the first and second polymers, or through the interface and the bondline, severely plasticizing the surrounding third polymer and the articles.

The invention will be further clarified by the following Examples, which are intended to be purely exemplary of the invention.

EXAMPLE 1

In this Example, two ⅛ inch×1 inch×5 inch (0.32 cm.× 2.54 cm.×12.7 cm.) PTFE articles were bonded according to the film method of the first embodiment. The surfaces of the articles bonded were first abraded with 80 grit sandpaper and wiped with methyl ethyl ketone (MEK). The surfaces of the articles were coated with PFA as follows: 10 mils (0.025 cm.) of PFA 2000 LP were applied to the surfaces to be bonded; and a plate heated to 360° C. was placed at the surface at 10 psi pressure (68.9 kPa) for 10 minutes. The bonded articles were then cooled slowly, not exceeding 5° C./minute under pressure.

The surfaces were then inspected to ensure that the PFA had fused into the articles. The PFA surfaces were placed upon each other, using an extra 10 mils (0.025 cm.) layer of PFA in between. The PFA surfaces were bonded together at 330° C. in an oven, 2.5 psi (17.2 kPa) for 5 minutes, and the overlap between the articles was 0.25 inches (0.64 cm.).

The articles were analyzed by lap shear and compact tension tests. The results are shown in Tables I and II.

The articles were also inspected by SEM and C-scan analysis. Scanning electron micrographs showed no undesired bubbling of the PFA surfaces and C-scans showed that the articles were well adhered.

EXAMPLE 2

In this Example one each of PTFE and TFM articles, ⅛ inch×1 inch×5 inch (0.32 cm.×2.54 cm.×12.7 cm.), were bonded according to the film method of the first embodiment. The surfaces of the articles to be bonded were first abraded with 80 grit sandpaper and wiped with methyl ethyl ketone (MEK). The surfaces of the articles were coated with PFA as follows: (1) 10 mils (0.025 cm.) of PFA 2000 LP were applied to the PTFE surface to be bonded; a plate heated to 360° C. was placed at the surface at 10 psi (68.9 kPa) for 10 minutes; (2) 10 mils (34.5 kPa) of PFA 2000 LP was applied to the TFM surface to be bonded; and a plate heated to 345° C. was placed at the surface at 5 psi (34.5 kPa) for 10 minutes. Both articles were cooled slowly, not exceeding 5° C./minute under pressure.

The surfaces were then inspected to ensure that the PFA had fused into the articles. The PFA surfaces were placed upon each other, using an extra 10 mils. (0.025 cm.) layer of PFA in between. The PFA films were bonded in an oven at 330° C., 2.5 psi (17.2 kPa) for 5 minutes, and the overlap between the articles was 0.25 inches (0.64 cm.).

The articles were analyzed by lap shear and compact tension tests. The results are shown in Tables I and II. SEM and C-scan analysis showed similar results as those found in Example 1.

EXAMPLE 3

In this Example, two ⅛ inch×1 inch×5 inch (0.32 cm.× 2.54 cm.×12.7 cm.) TFM articles were bonded according to the film method of the first embodiment. The surfaces of the articles to be bonded were first abraded with 80 grit sandpaper and wiped with methyl ethyl ketone (MEK). The surfaces of the articles were coated with PFA as follows: 10 mils (0.025 cm.) of PFA 2000 LP were applied to the surfaces to be bonded; and a plate heated to 345° C. was placed at the surface at 5 psi (17.2 kPa) for 10 minutes. The bonded articles were then cooled slowly, not exceeding 5° C./minute under pressure.

The surfaces were then inspected to ensure that the PFA had fused into the articles. The PFA surfaces were placed upon each other, using an extra 10 mil. layer of PFA in between. The PFA films were bonded at 330° C. in an oven, 2.5 psi (17.2 kPa) for 5 minutes, and the overlap between the articles was 0.25 inches (0.64 cm.).

The specimens were analyzed by lap shear and compact tension tests. The results are shown in Table I and II. SEM and C-scan analysis showed similar results as those found in Example I.

EXAMPLE 4

In this Example, the method of the second embodiment of the present invention is described. A PTFE nozzle with a flange and a sleeve was bonded to a PTFE sheet according to the method of the second embodiment. The nozzle had a 3-inch (7.62 cm.) O.D.; the sleeve was 1.75 inches (4.45 cm.) wide and ⅜ inches (0.95 cm.) thick. The PTFE sheet was also ⅜ inches (0.95 cm.) thick and had a hole to match the nozzle's O.D.

The nozzle was inserted inside the sheet to simulate a nozzle-to-liner weld. An 8-ply AS4/PFA quasi-isotropic lay-up was cut into a 3.25 inch (8.26 cm.) I.D. and 3.75 inch (9.52 cm.) O.D. sleeve, and an additional 10 mil (0.025 cm.) coating of PFA 2000 LP was applied on the top and the bottom of the sleeve. An induction heater was placed at the bondline to heat the PFA/carbon fiber sleeve. A pancake coil turned the generator at 106 KHz and maximum power, 7.2 KW. The pressure was 40 psi (276 kPa), and a cycling technique was used to obtain the desired temperature at the bondline, in which the generator was alternately on and off for 5-second periods. C-scan analysis indicated that good bonds were achieved by this method.

EXAMPLE 5

This is an example of the standard welding approach used by the industry to bond articles made of fluoropolymers by the industry to bond articles made of fluoropolymers. This example is representative of the best bond that can be obtained by the standard one-step process.

Two ⅛ inch×1 inch×5 inch (0.32 cm.×2.54 cm.×12.7 cm.) PTFE articles were bonded bonded. The surfaces of the articles to be bonded were first abraded with 80 grit sandpaper and wiped with methyl ethyl ketone (MEK). A PFA interlayer was fused onto each PTFE layer as follows: 10 mils (0.025 cm.) of PFA 2000 LP was inserted on the surfaces to be bonded. The articles were put in a single-lap shear lay-up with 0.25 inch (0.654 cm.) overlap. The articles were heated by heated platens from the top, bottom and sides of the PTFE article at 360° C. and 15 psi (103 kPa) for 10 minutes and were then cooled slowly, not exceeding 5° C./minute under pressure.

The bonds were analyzed by lap shear tests and results are shown in Table I. The articles were also inspected using SEM and C-scan analysis. Scanning electron micrographs showed some undesired bubbling of the interlayer, and C-scan showed that the articles were bonded together with some undesired spots where the interlayer had bubbled.

EXAMPLE 6

In this Example, two 1 inch×2 inch×⅛ inch (2.54 cm.× 5.08 cm.×0.32 cm.) PTFE articles were bonded according to the solution method of the first embodiment. The surfaces to be bonded were first sanded and then wiped clean with a solvent. The surfaces were then treated with Tetra-Etch®. A 3% solution of PTFE (Teflon® AF 1600, commercially available from DuPont) in FC 75 (commercially available from the 3M Company) was prepared and was applied to each surface with a brush. The solution coatings were allowed to dry at room temperature. Afterwards, the coatings could not be peeled off the surface of the articles. With this method, the surfaces were ed immediately after the solution was applied, and bond formed as the solution dried.

TABLE I

Tensile Lap Shear ASTM D3163

| Example | Parent Materials | Test Condition | Load from Tensile Shear (lbs)/(kN) | Failure Mode |
|---|---|---|---|---|
| 1 | PTFE/PTFE | −25° C. | 950/4.23 | Did not fail |
| 1 | PTFE/PTFE | 25° C. | 650/2.89 | Did not fail |
| 1 | PTFE/PTFE | 100° C. | 300/1.33 | Did not fail |
| 2 | PTFE/TFM | −25° C. | 1100/4.89 | Did not fail |
| 2 | PTFE/TFM | 25° C. | 700/3.11 | Did not fail |
| 2 | PTFE/TFM | 100° C. | 375/1.67 | Did not fail |
| 3 | TFM/TFM | −25° C. | 1100/4.89 | Did not fail |
| 3 | TFM/TFM | 25° C. | 725/3.22 | Did not fail |
| 3 | TFM/TFM | 100° C. | 500/2.22 | Did not fail |
| A | PTFE/PTFE | 25° C. | 271/1.21 | Bondline |

TABLE II

Compact Tension ASTM E399

| Example | Parent Materials | Test Condition | Average KIc (MPa m$^{-0.5}$) | Failure Mode |
|---|---|---|---|---|
| 1 | PTFE/PTFE | −35° C. | 1.2 +/− 0.2 | Bondline and Parent Material |
| 1 | PTFE/PTFE | 25° C. | 0.9 +/− 0.06 | Bondline and Parent Material |
| 1 | PTFE/PTFE | 105° C. | 0.6 +/− 0.02 | Interface + Bondline; Plasticizing |
| 2 | PTFE/TFM | −35° C. | 1.3 +/− 0.3 | Bondline and Parent Material |
| 2 | PTFE/TFM | 25° C. | 0.9 +/− 0.08 | Bondline and Parent Material |
| 2 | PTFE/TFM | 105° C. | 0.7 +/− 0.02 | Interface + Bondline; Plasticizing |
| 3 | TFM/TFM | −35° C. | 1.5 +/− 0.4 | Bondline and Parent Material |
| 3 | TFM/TFM | 25° C. | 1.1 +/− 0.08 | Bondline and Parent Material |
| 3 | TFM/TFM | 100° C. | 0.6 +/− 0.05 | Interface + Bondline; Plasticizing |

Other embodiments of the invention will be apparent to those skilled in the art from consideration of the specification and practice of the invention disclosed herein. It is intended that the specification and Examples be considered as exemplary only, with a true scope and spirit of the invention being indicated by the following claims.

What is claimed is:

1. A method for bonding a first article comprising polytetrafluoroethylene with a second article comprising tetrafluoroethylene, comprising the steps of:
   (a) coating a surface of the first article with a layer of a first fluoropolymer;
   (b) applying heat to the layer of the first fluoropolymer, so that the first fluoropolymer is above its melting point, to adhere the first fluoropolymer layer to the surface of the first article;
   (c) bonding the articles together by bringing a surface of the first fluoropolymer layer into contact with a surface of the second article after the first fluoropolymer layer has been adhered to the surface of the first article by the application of heat in step (b).

2. The method of claim 1, further including the steps of:
   (d) coating a surface of the second article with a layer of a second fluoropolymer;
   (e) applying heat to the layer of the second fluoropolymer to adhere the second fluoropolymer layer to the surface of the second article before bonding the articles together in step (c).

3. The method of claim 2, wherein the first fluoropolymer and the second fluoropolymer each have a lower melting point than polytetrafluoroethylene.

4. The method of claim 2, further including the step of abrading the surface of both articles before step (a).

5. The method of claim 2, further including the step of placing an interlayer comprising a third fluoropolymer between a surface of the first fluoropolymer layer and a surface of the second article or between a surface of the layer of the first fluoropolymer layer and a surface of the layer of the second fluoropolymer.

6. The method of claim 5, wherein the first fluoropolymer and the second fluoropolymer each have a lower melting point than polytetrafluoroethylene.

7. The method of claim 5, further including the step of abrading a surface of both articles before step (a).

8. The method of claim 2, 3, 4, 5, 6 or 7, wherein the first and the second fluoropolymers are the same polymer.

9. The method of claim 5, 6 or 7, wherein the first fluoropolymer, second fluoropolymer and third fluoropolymer are the same polymer.

10. The method of claim 8, wherein heat is applied to at least one of the articles in step (c).

11. The method of claim 9, wherein heat is applied to at least one of the articles in step (c).

12. The method of claim 8, wherein pressure is applied to the articles in step (c).

13. The method of claim 9, wherein pressure is applied to the articles in step (c).

14. The method of claim 10, wherein pressure is applied to the articles in step (c).

15. The method of claim 11, wherein pressure is applied to the articles in step (c).

* * * * *